United States Patent [19]

May

[11] Patent Number: 4,546,728

[45] Date of Patent: Oct. 15, 1985

[54] ANIMAL TRANSPORTATION CONTAINER

[75] Inventor: Gary A. May, Clearwater, Fla.

[73] Assignee: American K-9 Container Corporation, Safety Harbor, Fla.

[21] Appl. No.: 571,932

[22] Filed: Jan. 19, 1984

[51] Int. Cl.$^4$ .............................................. A01K 1/02
[52] U.S. Cl. .................................................... 119/19
[58] Field of Search .............. 119/1, 15, 19; 224/311, 224/319

[56] References Cited

U.S. PATENT DOCUMENTS

| | | | |
|---|---|---|---|
| 2,224,999 | 12/1940 | Mover | 119/1 X |
| 2,897,781 | 8/1959 | Olson | 119/19 |
| 3,490,417 | 1/1970 | Swinney | 119/19 |
| 4,201,153 | 5/1980 | Nace | 119/15 X |
| 4,220,119 | 9/1980 | Albright | 119/19 |
| 4,291,645 | 9/1981 | Cruchelow et al. | 119/19 |

FOREIGN PATENT DOCUMENTS

| | | | |
|---|---|---|---|
| 271279 | 1/1951 | Switzerland | 119/19 |
| 690639 | 4/1953 | United Kingdom | 119/19 |

Primary Examiner—Robert P. Swiatek
Attorney, Agent, or Firm—Frijouf, Rust & Pyle

[57] ABSTRACT

An animal transportation container is disclosed for accommodation within the rear compartment of an automobile. The container comprises a first receptacle element disposed adjacent the rear bulkhead of the automobile and a first flange extending around the periphery of the first receptacle element. A second receptacle element is disposed on the rear seat support of the automobile and a second flange extends around the periphery of the second receptacle element. A first portion of the second flange is disposed adjacent the first flange and a first portion of the first flange is disposed adjacent the first portion of the second flange. A plurality of threaded fasteners fasten together the first portions of the first and the second flanges respectively. A closure is disposed adjacent the first and the second receptacles for enclosing the first and the second receptacles and a first access door defined by the container is aligned with the door of the automobile for permitting the controlled access and exit of the animal relative the container.

18 Claims, 8 Drawing Figures

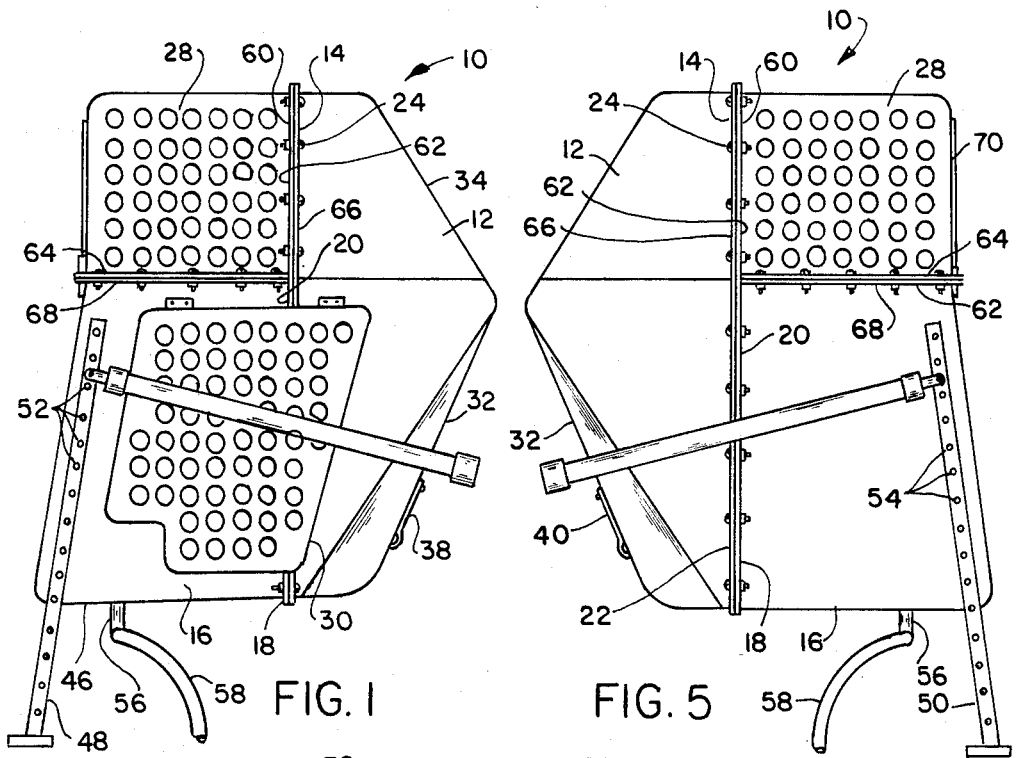
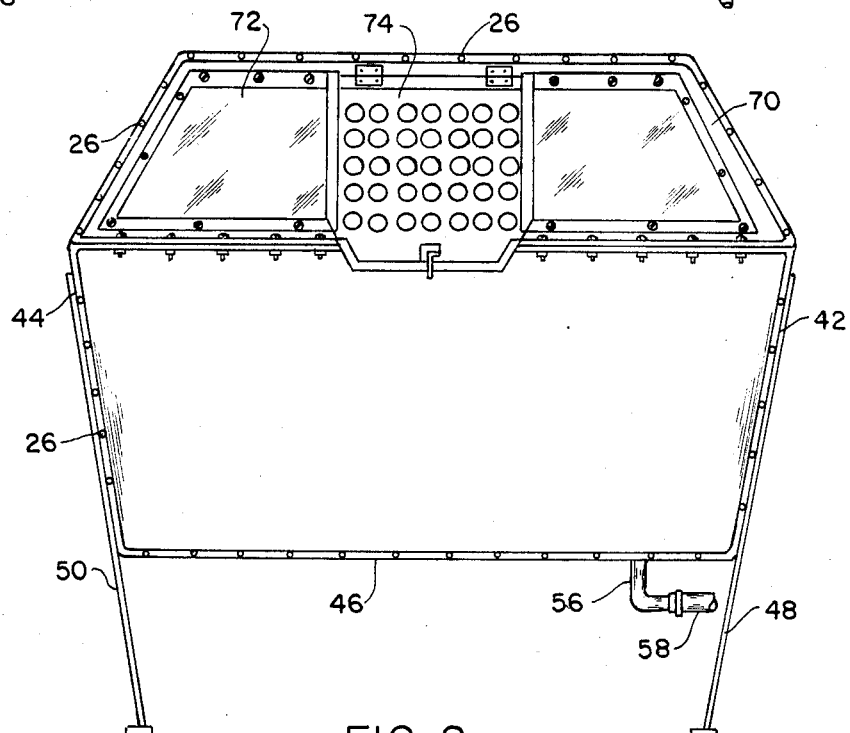

ANIMAL TRANSPORTATION CONTAINER

BACKGROUND OF THE INVENTION

1. Field of the Invention

This invention relates to an animal transportation container for accommodation adjacent the rear seat and door of an automobile. More particularly this invention relates to a dog kennel for accommodation on the back seat of an automobile.

2. Information Disclosure Statement

Traditionally, most owners of fairly large breeds of dogs have resorted to the purchase of station wagons and the like for the transportation of their animals. Normally the back compartment of the station wagon is partitioned off for the accommodation of the dog. However, many dog owners do not wish to purchase station wagons and the like and permit their dogs to be accommodated on the rear seat of their sedan automobile. Such accommodation of their dogs in the rear seat compartment imposes serious wear factors to the upholstery and a rapid deterioration of the interior of the vehicle.

When dogs are to be transported in a sedan automobile, the driver and front seat passengers are often distracted by the fact that the dogs salivate and shed hair on the clothing of the driver and passengers in addition to the front seat upholstery. Furthermore, there is the danger that if a passenger of the automobile opens the door of the car to get out, it is possible that the dog will jump onto the front seat and escape the vehicle which could impose a road hazard as well as be injurious to the dog. In addition, there is also the very real possibility of severe injury to driver and passengers should the driver be forced to come to an emergency stop or be involved in a collision. The dog in the rear compartment would not necessarily be prepared to brace for any defensive maneuvering and the force of the body of a dog, particularly one of the large or giant breeds, being catapulted against the head, neck and shoulder regions of the driver and passengers could possibly result in death, crushed vertebrae or dislocations, not to mention the injury to the animal should he be impaled on the steering column or be thrown through the windshield, side or rear windows.

Most police patrol cars are sedans and police dogs are traditionally transported in such sedan automobiles and sit on the back seat. However, the accommodation of such large breed dogs usually results in a rapid deterioration of the interior of the police car. It has been estimated that within one year of the purchase of a new patrol car, a dog may deteriorate the value of the interior of the car by at least $1,500. Such deterioration of the interior of the automobile is due to the dog sometimes chewing on door handles, soft upholstered panels or even the seats and carpeting. Additionally, there is the problem of infestation of the carpets and upholstery with parasites.

Prior art dog "crates" have been traditionally made of a collapsible, heavy gauge stainless steel, wire mesh, fiberglass or any combination thereof. While these containers are sufficiently portable in nature for use with small dogs and animals, a problem arises with large and giant breed dogs. The kennels made for these particular breeds are usually of a height and width that cannot be accommodated in the rear seating area without creating corner tears in the upholstery and roof padding, if in fact they can be assembled in an upright position at all. While a crate may be wedged in the rear seating area in a collapsed condition, there is not sufficient clearance for the four corner rods to be vertically inserted, these rods being necessary to support the crate in an assembled condition. Newer folding models still have a similar flaw in that while corner supports are not mandatory, the top of the crate becomes the main support and is of one piece construction, thereby needing at least the clearance of the width of the crate above it in order to complete assembly. Prior art fiberglass crates similar to those used by airlines for transporting pets on domestic and international flights are the most practical for use in a car as they assemble in two half sections that are bolted together longitudinally. While normally of sufficient size for a large breed dog, they are too small for the giant breeds as they are a maximum of thirty inches high. Many of the giant breeds require from thirty-two inches to thirty-eight inches at the shoulder in order to access the container. The rigid flooring of these crates also presents a problem. As the prior art dog container is designed to rest on a flat surface, when placed in an automobile, the crate rests solely on the rear seat itself. Most rear sedan seats have an average depth of twenty inches, the twenty inches gradually sloping towards the rear in a downward manner. The average large and giant breed prior art dog crate is at least twenty-four to thirty-two inches in width, the excess width either hanging over the edge of the seat or being tilted back to rest against the upper portion of the rear seat. Either of these two instances creates an unsafe environment for the dog as he is either riding at an angle at all times or, should the pet move about to turn around, possibly causing the crate to slide off the rear seat to wedge between the backs of the front seats, the floor and the rear seat itself. Still another drawback in prior art devices is the limited access to the dog as these crates are designed with only one doorway. In case of an emergency, accident or injury, these prior art devices may prevent timely removal of the pet from the transportation container should access to the one doorway be prevented by a jammed or damaged vehicle door.

The present invention provides an animal transportation container for accommodation within the rear compartment of a standard sedan automobile, the animal transportation container being supported on the rear seat of the automobile. Such animal transportation container is easily installed within the rear seating compartment of the sedan automobile and avoids the deteriorating effect that is associated with the normal transportation of dogs with a sedan. Furthermore, by means of the transportation container of the present invention, the dog is kept safely within the container until the owner is ready to remove the dog from the car thus avoiding danger to road traffic in the area and injury to the animal. By providing a transportation container disposed adjacent the rear seat of a sedan, the driver and passenger of the vehicle avoid the distraction and annoyance of soiled clothing, and the aggravation of the pet attempting to ride in the front seat while the owner is driving the vehicle.

Therefore, it is the primary object of this invention to provide an apparatus that overcomes the aforementioned inadequacies of the prior art dog dividers and the like and provides an improvement which significantly contributes to the ease with which dogs can be accommodated within the rear seat compartment of a standard sedan automobile.

Another object of this invention is to provide an animal transportation container in which the animal is enclosed within the rear seat compartment of a standard sedan vehicle.

Another object of this invention is the provision of an animal transportation container that prevents the dog from gaining access to the front seat of an automobile unless the owner permits the same.

Another object of the invention is the provision of an animal transportation container that avoids the deteriorating effect of a dog accommodated within the rear seat compartment of a standard automobile.

Another object of the present invention is the provision of a drainage device which permits easy cleaning of the interior of the transportation container.

Another object of the present invention is the provision of an animal transportation container which is easily assembled within the rear seat compartment of a sedan automobile.

Another object of the present invention is the provision of an animal transportation container comprising a first and second receptacle element disposed on the rear seat support of the automobile and a closure disposed adjacent the first and the second receptacle elements for enclosing the first and second receptacle elements and a first access means defined by the container, the first access means being aligned with the rear door of the automobile for permitting controlled ingress and egress of the animal relative the container.

Another object of the present invention is the provision of a lockable sliding glass window or lockable flap door disposed adjacent the front wall of the closure for permitting the exit of the dog from the container to the front seat of the automobile.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention within the scope of the invention. Particularly with regard to the use of the invention disclosed herein, this should not be construed as limited to animal transportation containers for accommodation within the rear seat of a sedan model automobile, but should include such containers for accommodation within the rear seat compartment of any vehicle.

SUMMARY OF THE INVENTION

The animal transportation container of the present invention is defined by the appended claims with a specific embodiment shown in the attached drawings. For the purpose of summarizing the invention, the invention relates to an animal transportation container for accommodation adjacent the rear seat bulkhead and door of an automobile. The container comprises a first receptacle element disposed adjacent the rear seat bulkhead of the automobile and a first flange extending around the periphery of the first receptacle element. A second receptacle element is disposed on the rear seat support of the automobile and a second flange extends around the periphery of the second receptacle element. A first portion of the second flange is disposed adjacent the first flange and a first portion of the first flange is disposed adjacent the first portion of the second flange. A plurality of threaded fasteners fasten together the first portions of the first and second flanges, respectively. A closure is disposed adjacent the first and second receptacle elements for enclosing the first and the second receptacles and a first access door is defined by the container. The access door is aligned with the door of the automobile for permitting the controlled ingress and egress of the animal relative the container.

In a more specific embodiment of the invention, the first receptacle element includes a first wall disposed adjacent the rear seat bulkhead of the car and a second wall disposed adjacent the first wall. A first translucent window panel is defined by the second wall. A pair of sheet metal spring hooks attached to the first wall anchor the first wall to the rear seat hooks of the automobile when the rear seat is removed from the automobile. The second receptacle element includes a first and second side wall and a base extending between the side walls. First and second elongate bar sections support the container and are secured adjacent the first and the second side walls, respectively. The first and second bar sections define a plurality of bores which are spaced along the length of each of the bar sections and the bores cooperate with the rear seat belts of the automobile so that the seat belts are able to stabilize the container adjacent the rear seat support. The flanges of the receptacle elements and closure cooperate together and define a plurality of holes and a plurality of threaded fasteners extend through the holes to fasten together the receptacle elements and closure to provide a container for enclosing the animal.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a side elevational view of the animal transportation container;

FIG. 2 is a front elevational view of the animal transportation container shown in FIG. 1;

FIG. 5 is a side elevational view of the dog container shown in FIG. 1 as viewed from the opposite side of that shown in FIG. 1;

Similar reference characters refer to similar parts through the several views of the drawings.

DETAILED DESCRIPTION

Figure 3:
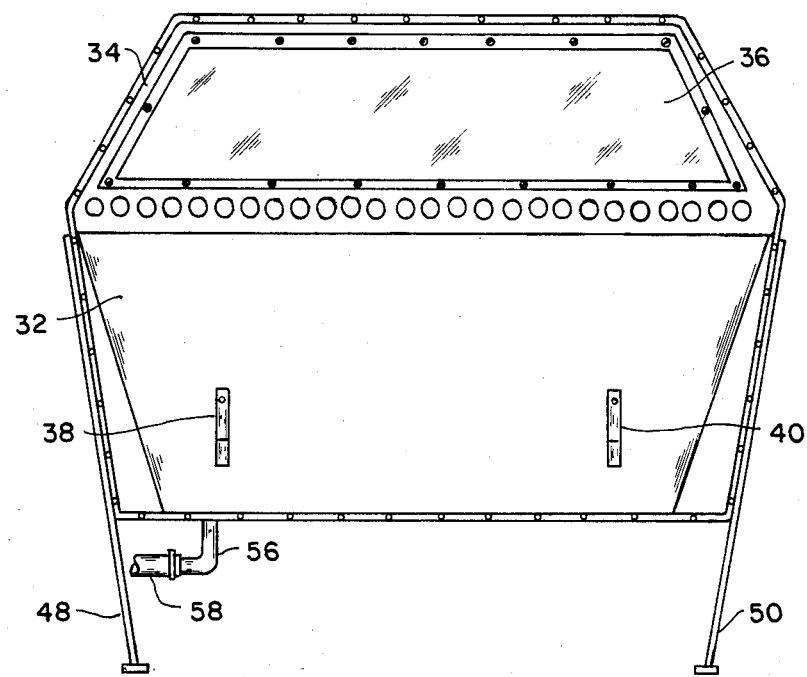
FIG. 3 is a rear elevational view of the animal transportation container shown in FIG. 1.
Figure 4:
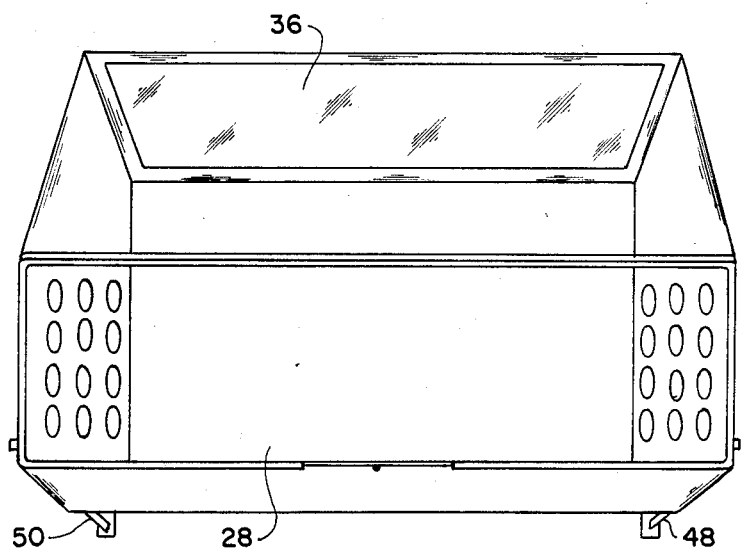
FIG. 4 is a top plan view of the animal transportation container shown in FIG. 1.

FIG. 1 is a side elevational view of the animal transportation container for accommodation within the rear seat compartment of an automobile. The animal transportation container is generally designated 10, the container 10 including a first receptacle element 12 which is disposed adjacent the bulkhead of the automobile after the rear seat backrest has been removed from the automobile. A first flange 14 of the first receptacle element 12 extends around the periphery of the first receptacle element 12. A second receptacle element 16 is disposed in place of the lower rear seat of the automobile. A second flange 18 extends around the periphery of the second receptacle element 16. A first portion 20 of the second flange 18 is disposed adjacent the first flange 14. A first portion 22 of the first flange 14 is disposed adjacent the first portion 20 of the second flange. A plurality of threaded fasteners 24 extend through aligned holes 26 defined by the first and the second flanges 14 and 18, respectively. The threaded fasteners 24 fasten together the first portions 20 and 22 of the flanges 14 and 18. A closure 28 is disposed adjacent the first and second receptacle elements 12 and 16, respectively, such that the closure 28 encloses the first and second receptacle elements 12 and 16. A first access door 30 is defined by the container 10 such that the access door 30 is aligned with the door of the automobile for permitting the controlled ingress and egress of the animal relative the container 10.

The first receptacle element 12 further includes a first wall 32 disposed adjacent the rear bulkhead of the automobile. A second wall 34 is disposed adjacent the first wall 32 and a first translucent window panel 36 shown in FIG. 3 is defined by the second wall 34. A pair of sheet metal spring hooks 38 and 40, respectively, are attached to the first wall 32 and cooperate with a pair of rear seat hooks of the automobile which normally anchor the rear seat of the automobile.

The second receptacle element 16 further includes a first side wall 42 and a second side wall 44 disposed opposite the first side wall 42. A base 46 extends between the first and second side walls 42 and 44, respectively. A first and a second elongate bar section support 48 and 50, respectively, are secured to the first and the second side walls 42 and 44, respectively. The supports 48 and 50 stabilize the container 10 relative the automobile. The supports 48 and 50 include a plurality of bores 52 and 54 which are spaced along the respective lengths of the supports 48 and 50. The bores cooperate with the respective rear seat belts of the automobile so that when the seat belts are fastened to the supports 48 and 50, the container is firmly stabilized within the rear seat compartment of the automobile. The base 46 defines a drain 56 which permits the cleaning and drainage of the interior of the container 10 and a pipe 58 connects the drain to the outside of the automobile.

The first and second receptacles 12 and 16, respectively, and the closure 28 are connected together by means of flanges 14 and 18 disposed on the receptacles and a third flange 60 disposed on the closure 28. The third flange 60 of the closure 28 includes a first and a second portion 62 and 64, respectively. The first portion 62 of the third flange 60 cooperates with a second portion 66 of the first flange 14, and the second portion 64 of the third flange 60 cooperates with a second portion 68 of the second flange 18 such that the receptacles 12 and 16, respectively, and the closure 28 cooperate together to form an enclosure for enclosing the animal within the container 10.

The closure 28 further includes a front wall 70 which is disposed remote relative the first receptacle 12. A second translucent window panel 72 as shown in FIG. 2 is defined by the front wall 70 and a second access door 74 is defined by the second window 72 such that the second access door 74 permits controlled ingress and egress of the animal from the container 10. Preferably the second access door is a lockable flap but alternatively the second access door may be a slidable door.

In a preferred embodiment of the present invention, the first and second receptacles 12 and 16 and the closure 28 are of a vacuum-formed plastics material, preferably ABS material and are dimensioned such that the receptacles and closure are fastened together after accommodation within the automobile. The first access door 30, the closure 28, the second access door 74 and the second wall 34 of the first receptacle 12, may all be provided with ventilation apertures to permit a flow of air through the container.

The installation of the animal transportation container within the rear seat compartment of the automobile is accomplished by, firstly, removing from the sedan the rear seat cushion and the rear seat backrest, and then positioning the first receptacle 12 within the rear seat compartment with the hooks 38 and 40 attached to the hooks that are normally provided to hold the backrest of the rear seats. The second receptacle 16 is then positioned adjacent the first receptacle with the first portion 20 of the second flange 18 disposed adjacent the first portion 22 of the first flange 14 and the threaded fasteners 24 threaded through the plurality of holes 26 to fasten the receptacles together. The seat belts of the car are extended and clipped onto the supports 48 and 50 to support the first and second receptacles 12 and 16, respectively, and the closure 28 is aligned with the second portions 66 and 68 of the first and the second flanges 14 and 18 of the first and second receptacles 12 and 16, respectively, such that the first portion 62 of the third flange 60 cooperates with the second portion 66 of the first flange 14 and the second portion 64 of the third flange 60 cooperates with the second portion 68 of the second flange 18. Finally, the pipe 58 is connected to the drain 56 and is inserted through the drain plug located in the floor of the automobile so that the interior of the container 10 is in communication with the exterior of the car.

Figure 6:
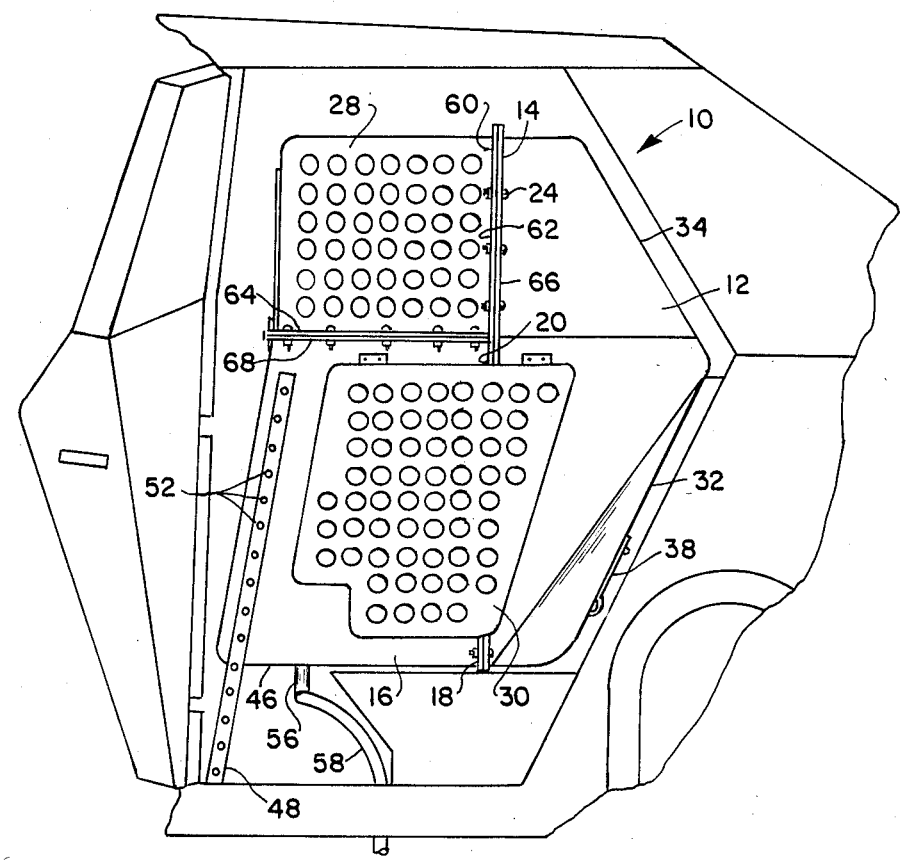
FIG. 6 is a perspective view of the animal transportation container as shown in FIG. 1 installed within the rear compartment of a sedan with the rear door of the sedan open.
Figure 7:
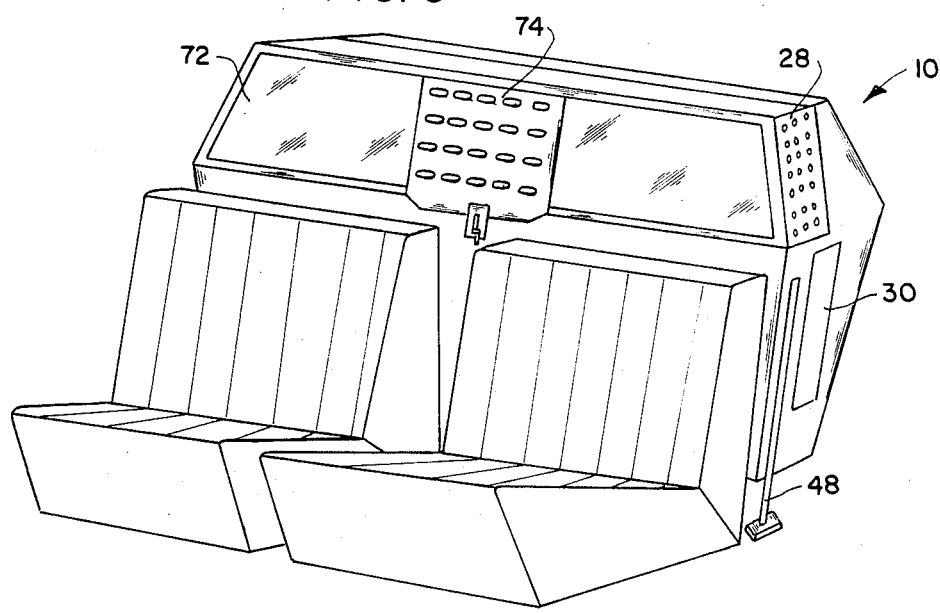
FIG. 7 is a perspective view of the container shown in FIG. 1 showing the second access door and its location relative the front seats of a sedan.

When it is required to lead the dog into or out of the container 10, the rear door of the car is opened as shown in FIG. 6 and the first access door 30 is opened to permit the dog to enter the container 10. The second access door 74 includes a lock which may be opened from the front compartment of the automobile as shown in FIG. 7 such that when unlocked, the dog is able to jump through the second access door onto the front seat of the vehicle. In the case of a police K-9 unit, an officer may open the second access door 74 and leave the front door window open. Accordingly, if the dog is required by the police officer, then the officer may merely call the dog who will jump onto the front seat and out of the automobile through the front door window.

Figure 8:
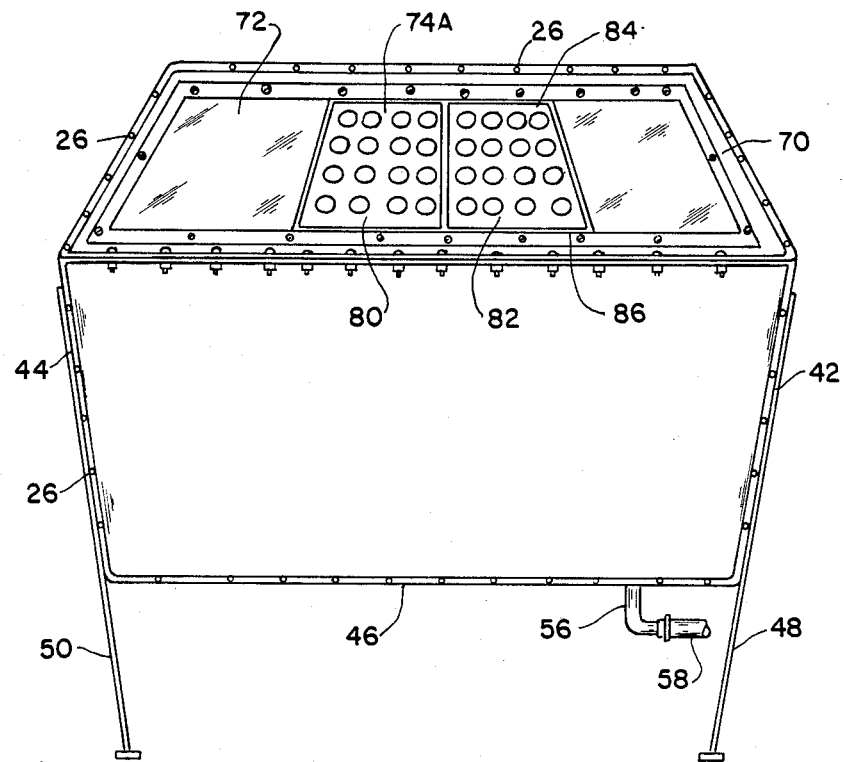
FIG. 8 is a perspective view of the container shown in FIG. 1 showing a second variation of the second access door.

FIG. 8 illustrates a variation of the second access door 74A comprising door sections 80 and 82 which are slidably mounted in tracks 84 and 86. In some applications, it may be desirable to use a sliding door or doors as shown in FIG. 8 in lieu of a pivoting door.

The animal transportation container of the present invention provides a useful means for containing particularly a dog within the rear seat compartment of a standard sedan automobile. The container of the present invention greatly extends the useful life of a sedan automobile that would otherwise deteriorate rapidly with transportation of the animal within the back compartment of the car. Also, the present invention provides a safety factor in the transportation of a dog within a vehicle and avoids the potential traffic hazard that the transportation of such dog customarily presents due to the fact that the dog normally would be able to jump out of the vehicle upon opening of the car door. Furthermore, the container of the present invention provides an easily installed device for installation within a sedan car and avoids the necessity for a dog owner to purchase a station wagon or van as has customarily been the case in the past prior to the present invention.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An animal transportation container for accommodation adjacent the rear seat bulkhead and a door of an automobile, the container comprising in combination:
   a first receptacle element disposed adjacent the rear bulkhead of the automobile;
   a first flange extending around the periphery of said first receptacle element;
   a second receptacle element disposed in the space normally occupied by the rear seat support of the automobile;
   a second flange extending around the periphery of said second receptacle element;
   a first portion of said second flange disposed adjacent said first flange;
   a first portion of said first flange disposed adjacent said first portion of said second flange;
   a fastening means for fastening together said first portions of said first and said second flanges, respectively;
   a closure receptacle disposed adjacent said first and second receptacle elements for closing said first and said second receptacle elements;
   a first access means defined by the container, said access means being aligned with the door of the automobile for permitting the controlled ingress and egress of the animal relative the container; and
   a second access means defined by said closure receptacle for permitting egress of the animal to a front seat of the automobile.

2. An animal transportation container set forth in claim 1 wherein said first receptacle element further includes:
   a first wall disposed adjacent the rear seat bulkhead;
   a second wall disposed adjacent said first wall; and
   a first translucent window panel defined by said second wall.

3. An animal transportation container as set forth in claim 2 further including an anchoring means attached to said first wall for anchoring said first wall relative the rear seat bulkhead of the automobile.

4. An animal transportation container as set forth in claim 3 wherein said anchoring means comprises a sheet metal spring hook which cooperates with a rear seat hook when the rear seat cushion is removed from the automobile.

5. An animal transportation container as set forth in claim 1 wherein said first receptacle element is of plastics material.

6. An animal transportation container as set forth in claim 1 wherein said first flange is integrally molded together with said receptacle element.

7. An animal transportation container as set forth in claim 1 wherein said second receptacle element further comprises:
   a first side wall;
   a second side wall disposed opposite said first side wall;
   a base extending between said first and second side walls;
   a first support means secured to said first side wall for stabilizing the container relative the rear seat support;
   a second support means secured to said second side wall for stabilizing the container relative the rear seat support.

8. An animal transportation container as set forth in claim 7 further including a drain means disposed adjacent said base for permitting drainage from the interior of the container to the outside of the automobile.

9. An animal transportation container as set forth in claim 1 wherein said second receptacle element is of plastics material.

10. An animal transportation container as set forth in claim 1 wherein said fastening means includes a plurality of spaced holes defined by said first and said second flanges, said holes of said first flange being aligned with said holes of said second flange; and
    a plurality of threaded fasteners extending through said holes in said first and said second flanges.

11. An animal transportation container as set forth in claim 1 wherein said first access means comprises a lockable flap door which cooperates with an opening defined by said first and said second receptacle elements.

12. An animal transportation container as set forth in claim 1 wherein said receptacle elements and closure means are dimensioned such that said receptacle elements and closure means are fastened together after accommodation within the automobile.

13. An animal transportation container for accommodation adjacent the rear seat bulkhead and a door of an automobile, the container comprising in combination:
    a first receptacle element disposed adjacent the rear bulkhead of the automobile;
    a first flange extending around the periphery of said first receptacle element;
    a second receptacle element disposed in the space normally occupied by the rear seat support of the automobile;
    said second receptacle element further including:
    a first sidewall;

a second sidewall disposed opposite said first side wall;
a base extending between said first and said second side walls;
a first support means secured to said first side wall for stabilizing the container relative the rear seat support;
a second support means secured to said second side wall for stabilizing the container relative the rear seat support;
said first and said second support means each comprising an elongate bar section;
a plurality of bores spaced along the length of each of said bar sections, one of said bores of each bar section cooperating with the seat belt of the rear seat such that the transportation container is stabilized within the automobile;
a second flange extending around the periphery of said second receptacle element;
a first portion of said second flange disposed adjacent said first flange;
a first portion of said first flange disposed adjacent said first portion of said second flange;
a fastening means for fastening together said first portions of said first and said second flanges, respectively;
a closure receptacle means disposed adjacent said first and said second receptacle elements enclosing said first and said second receptacle elements; and
a first access means defined by the container, said access means being aligned with the door of the automobile for permitting the controlled ingress and egress of the animal relative the container.

14. An animal transportation container for accommodation adjacent the rear seat bulkhead and the door of an automobile, the container comprising in combination:
a first receptacle element disposed adjacent the rear bulkhead of the automobile;
a first flange extending around the periphery of said first receptacle element;
a second receptacle element disposed in the space normally occupied by the rear seat support of the automobile;
a second flange extending around the periphery of said second receptacle element;
a first portion of said second flange disposed adjacent said first flange;
a first portion of said first flange disposed adjacent said first portion of said second flange;
a fastening means for fastening together said first portions of said first and said second flanges, respectively;
a closure receptacle means disposed adjacent said first and second receptacle elements enclosing said first and said second receptacle elements;
said closure receptacle means further including:
a third flange extending around the periphery of said closure receptacle means;
a first and a second portion of said third flange disposed adjacent said first and said second receptacle elements, respectively;
a second portion of said first flange cooperating with said first portion of said third flange;
a second portion of said second flange cooperating with said second portion of said third flange;
a first access means defined by the container, said access means being aligned with the door of the automobile for permitting the controlled ingress and egress of the animal relative the container.

15. An animal transportation container as set forth in claim 14 wherein said first and said second portions of said third flange define a plurality of holes which are aligned with holes defined by said second portions of said first and said second flanges; and
a plurality of threaded fasteners extending through said aligned holes of said second portions of said first and said second flanges such that said closure means forms an enclosure for the animal.

16. An animal transportation container for accommodation adjacent the rear seat bulkhead and a door of an automobile, the container comprising in combination:
a first receptacle element disposed adjacent the rear bulkhead of the automobile;
a first flange extending around the periphery of said first receptacle element;
a second receptacle element disposed in the space normally occupied by the rear seat support of the automobile;
a second flange extending around the periphery of said second receptacle element;
a first portion of said second flange disposed adjacent said first flange;
a first portion of said first flange disposed adjacent said first portion of said second flange;
a fastening means for fastening together said first portions of said first and said second flanges, respectively;
a closure receptacle means disposed adjacent said first and second receptacle elements enclosing said first and said second receptacle elements;
a first access means defined by the container, said access means being aligned with the door of the automobile for permitting the controlled ingress and egress of the animal relative the container;
said closure receptacle means further including:
a front wall disposed remote relative said first receptacle element;
a translucent window panel defined by said front wall; and
a second access means defined by said window panel, said second access means permitting controlled exit of the animal relative the container.

17. An animal transportation container as set forth in claim 16 wherein said second access means comprises a lockable flap.

18. An animal transportation container as set forth in claim 16 wherein said second access means comprises a sliding door.

* * * * *